United States Patent
Zhang et al.

(10) Patent No.: US 11,647,509 B2
(45) Date of Patent: May 9, 2023

(54) GAP BETWEEN DOWNLINK CONTROL INFORMATION AND CORRESPONDING DOWNLINK AND UPLINK COMMUNICATIONS

(71) Applicant: QUALCOMM Incorporated, San Diego, CA (US)

(72) Inventors: Qian Zhang, Basking Ridge, NJ (US); Yan Zhou, San Diego, CA (US); Junyi Li, Franklin Park, NJ (US); Navid Abedini, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 17/211,483

(22) Filed: Mar. 24, 2021

(65) Prior Publication Data
US 2022/0312390 A1    Sep. 29, 2022

(51) Int. Cl.
*H04W 72/04* (2023.01)
*H04W 72/044* (2023.01)

(52) U.S. Cl.
CPC ....... *H04W 72/042* (2013.01); *H04W 72/046* (2013.01)

(58) Field of Classification Search
CPC .......................... H04W 72/042; H04W 72/046
See application file for complete search history.

(56) References Cited

U.S. PATENT DOCUMENTS

| | | |
|---|---|---|
| 2019/0254061 A1 | 8/2019 | Manolakos et al. |
| 2019/0104543 A1* | 9/2019 | Park ................. H04L 1/1854 |
| 2020/0221433 A1* | 7/2020 | Park ................. H04W 72/042 |
| 2020/0221485 A1 | 7/2020 | Cirik et al. |
| 2021/0274549 A1* | 9/2021 | Park ................. H04W 74/002 |
| 2022/0279564 A1* | 9/2022 | Li ...................... H04L 1/08 |

FOREIGN PATENT DOCUMENTS

| | | |
|---|---|---|
| WO | 2019099659 A1 | 5/2019 |
| WO | 2019195528 A1 | 10/2019 |
| WO | 2020223111 A1 | 11/2020 |

OTHER PUBLICATIONS

International Search Report and Written Opinion—PCT/US2022/070963—ISA/EPO—dated Jun. 15, 2022.

* cited by examiner

*Primary Examiner* — Ronald B Abelson
(74) *Attorney, Agent, or Firm* — Harrity & Harrity, LLP

(57) ABSTRACT

Various aspects of the present disclosure generally relate to wireless communication. In some aspects, a user equipment (UE) may receive a downlink control information (DCI) transmission that schedules an uplink communication and a downlink communication and that indicates a gap between reception of the DCI transmission and transmission of the uplink communication. The UE may receive the downlink communication and transmit the uplink communication based at least in part on the DCI transmission and the gap. Numerous other aspects are described.

28 Claims, 8 Drawing Sheets

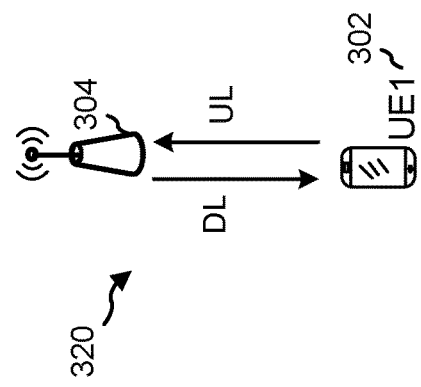
FIG. 3B
FIG. 3C
FIG. 3A

GAP BETWEEN DOWNLINK CONTROL INFORMATION AND CORRESPONDING DOWNLINK AND UPLINK COMMUNICATIONS

FIELD OF THE DISCLOSURE

Aspects of the present disclosure generally relate to wireless communication and to techniques and apparatuses for a gap between downlink control information and corresponding downlink and uplink communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors, coupled to the memory, configured to: receive a downlink control information (DCI) transmission that schedules an uplink communication and a downlink communication and that indicates a gap between reception of the DCI transmission and transmission of the uplink communication; and receive the downlink communication and transmit the uplink communication based at least in part on the DCI transmission and the gap.

In some aspects, a base station for wireless communication includes a memory and one or more processors, coupled to the memory, configured to: transmit a DCI transmission that schedules an uplink communication and a downlink communication and that indicates a gap between reception of the DCI transmission and transmission of the uplink communication; and transmit the downlink communication and receive the uplink communication based at least in part on the DCI transmission and the gap.

In some aspects, a method of wireless communication performed by a UE includes receiving a DCI transmission that schedules an uplink communication and a downlink communication and that indicates a gap between reception of the DCI transmission and transmission of the uplink communication; and receiving the downlink communication and transmitting the uplink communication based at least in part on the DCI transmission and the gap.

In some aspects, a method of wireless communication performed by a base station includes transmitting a DCI transmission that schedules an uplink communication and a downlink communication and that indicates a gap between reception of the DCI transmission and transmission of the uplink communication; and transmitting the downlink communication and receiving the uplink communication based at least in part on the DCI transmission and the gap.

In some aspects, a non-transitory computer-readable medium storing a set of instructions for wireless communication includes one or more instructions that, when executed by one or more processors of a UE, cause the UE to: receive a DCI transmission that schedules an uplink communication and a downlink communication and that indicates a gap between reception of the DCI transmission and transmission of the uplink communication; and receive the downlink communication and transmit the uplink communication based at least in part on the DCI transmission and the gap.

In some aspects, a non-transitory computer-readable medium storing a set of instructions for wireless communication includes one or more instructions that, when executed by one or more processors of a base station, cause the base station to: transmit a DCI transmission that schedules an uplink communication and a downlink communication and that indicates a gap between reception of the DCI transmission and transmission of the uplink communication; and transmit the downlink communication and receive the uplink communication based at least in part on the DCI transmission and the gap.

In some aspects, an apparatus for wireless communication includes means for receiving a DCI transmission that schedules an uplink communication and a downlink communication and that indicates a gap between reception of the DCI transmission and transmission of the uplink communication; and means for receiving the downlink communication and transmitting the uplink communication based at least in part on the DCI transmission and the gap.

In some aspects, an apparatus for wireless communication includes means for transmitting a DCI transmission that schedules an uplink communication and a downlink communication and that indicates a gap between reception of the DCI transmission and transmission of the uplink communication; and means for transmitting the downlink communication and receiving the uplink communication based at least in part on the DCI transmission and the gap.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A-3C are diagrams illustrating examples of full duplex communications, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
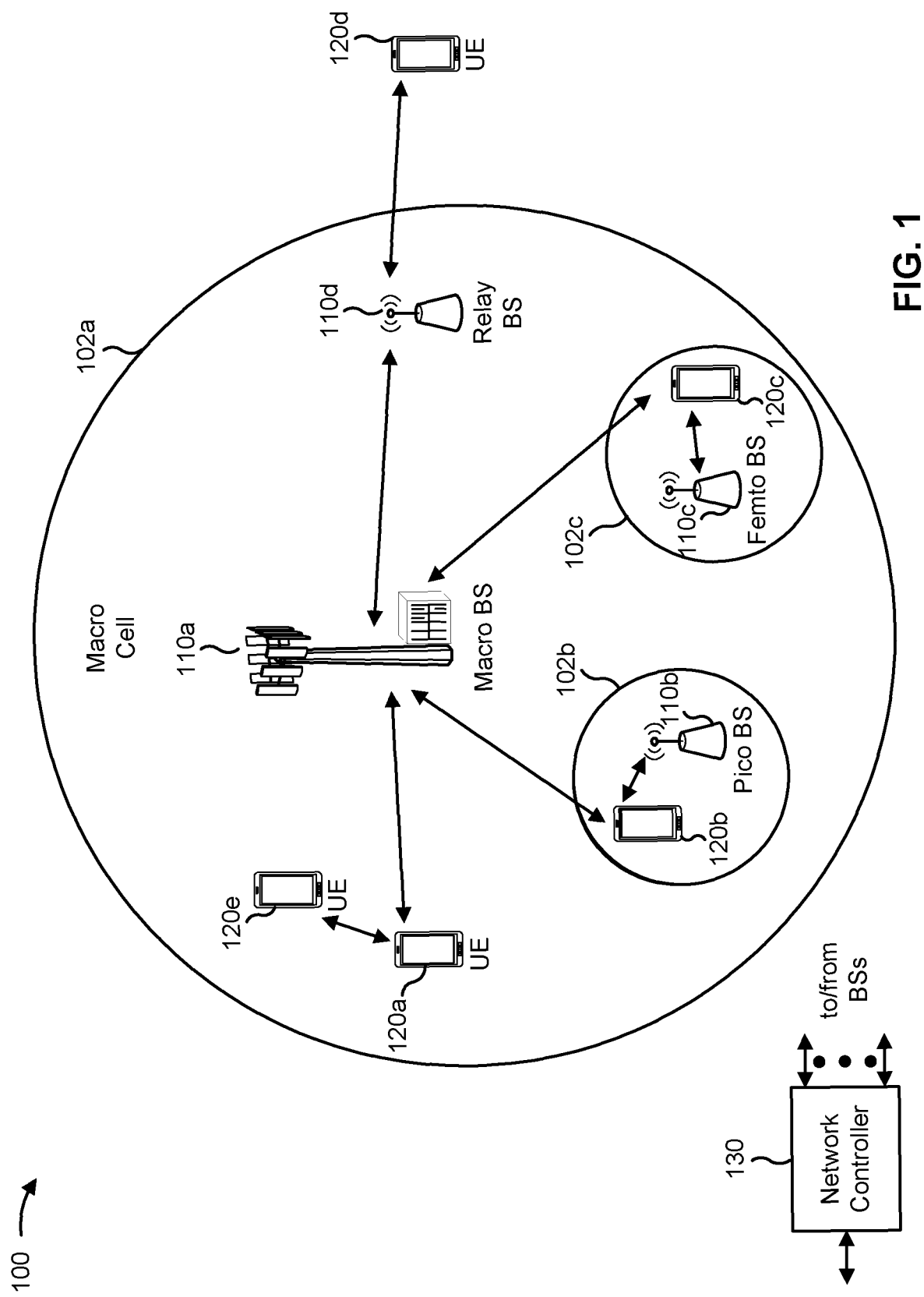
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs)

and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
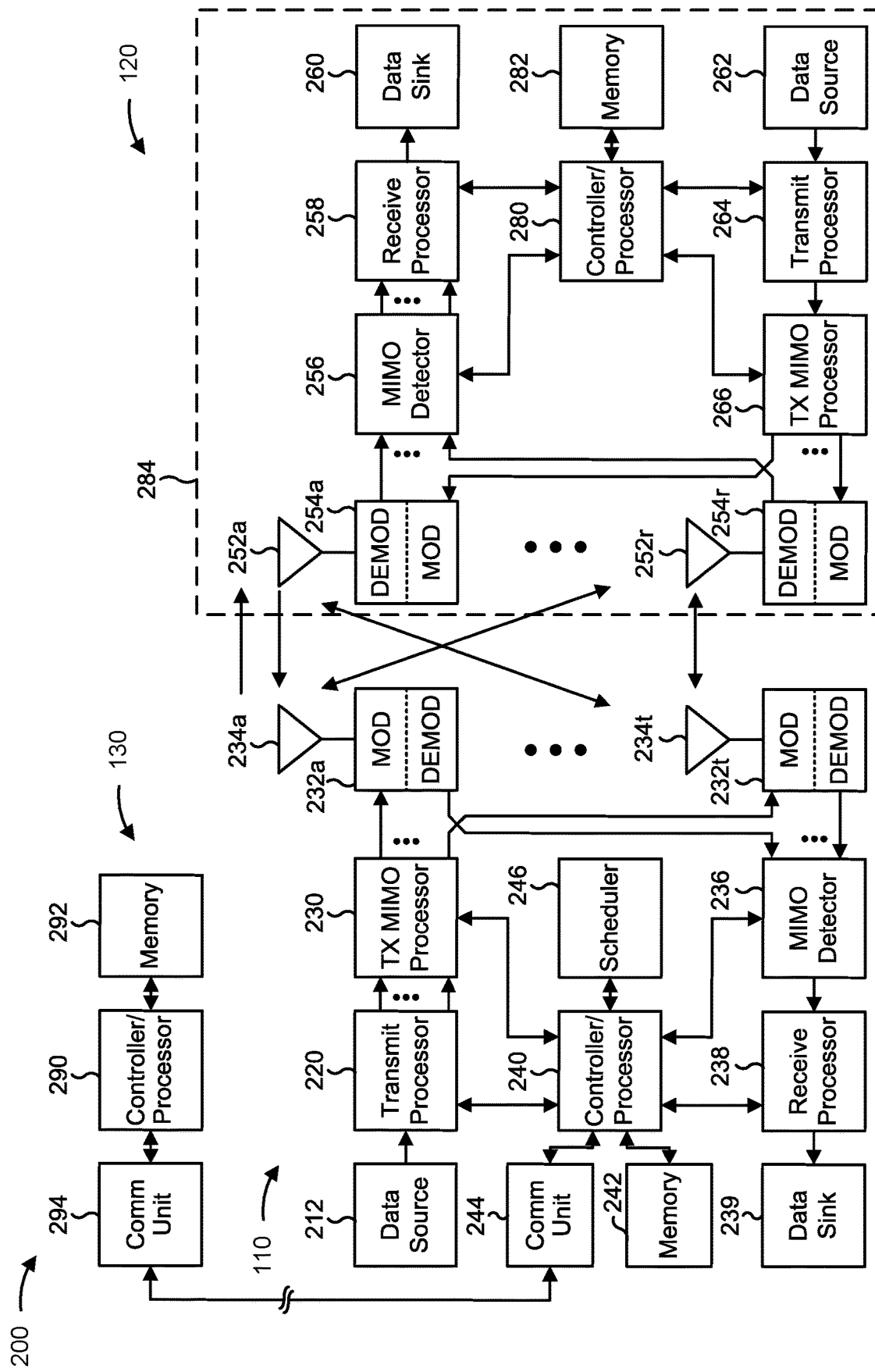
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-6).

Controller/processor 240 of base station 110, controller/processor 280 of UE 120, and/or any other component(s) of FIG. 2 may perform one or more techniques associated with a gap between downlink control information (DCI) and corresponding downlink and uplink communications, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, the UE includes means for receiving a DCI transmission that schedules an uplink communication and a downlink communication and that indicates a gap between reception of the DCI transmission and transmission of the uplink communication; and/or means for receiving the downlink communication and transmitting the uplink communication based at least in part on the DCI transmission and the gap. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station includes means for transmitting a DCI transmission that schedules an uplink communication and a downlink communication and that indicates a gap between reception of the DCI transmission and transmission of the uplink communication; and/or means for transmitting the downlink communication and receiving the uplink communication based at least in part on the DCI transmission and the gap. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

FIGS. 3A-3C are diagrams illustrating examples 300, 310, 320 of full duplex (FD) communication in accordance with the present disclosure. The example 300 of FIG. 3A includes a UE1 302 and two base stations (e.g., TRPs) 304-1, 304-2, wherein the UE1 302 is sending uplink (UL) transmissions to base station 304-1 and is receiving downlink (DL) transmissions from base station 304-2. In the example 300 of FIG. 3A, FD is enabled for the UE1 302, but not for the base stations 304-1, 304-2. The example 310 of FIG. 3B includes two UEs, UE1 302-1 and UE2 302-2, and a base station 304, wherein the UE1 302-1 is receiving a DL transmission from the base station 304 and the UE2 302-2 is transmitting a UL transmission to the base station 304. In the example 310 of FIG. 3B, FD is enabled for the base station 304, but not for the UEs UE1 302-1 and UE2 302-2. The example 320 of FIG. 3C includes a UE1 302 and a base station 304, wherein the UE1 302 is receiving a DL transmission from the base station 304 and the UE1 302 is transmitting a UL transmission to the base station 304. In the example 320 of FIG. 3C, FD is enabled for both the UE1 302 and the base station 304.

The present disclosure generally relates to scheduling resources for FD communication. FD capability may be present at either a base station or a UE, or both. For example, for a UE, UL transmission may be from one antenna panel, and DL reception may be in another antenna panel. FD communication may be conditional on a beam separation of the UL beam and DL beam at the respective antenna panels. Utilizing FD communication may provide a reduction in latency, such that it may be possible to receive a DL signal in UL-only slots, which may enable latency savings. In addition, FD communication may enhance spectrum efficiency per cell or per UE, and may allow for a more efficient utilization of resources.

Beam separation of the UL and DL beams assist in limiting or reducing self-interference that may occur during FD communication. It is desirable to select UL and DL beams that are on different antenna panels to minimize self-interference. Determining the UL and DL beams that are separated on their respective antenna panels may provide a reliable FD communication by facilitating selection of beam pairs that minimize or reduce self-interference.

An FD UE may perform a self-interference measurement (SIM) procedure in order to identify self-interference from transmissions of the FD UE. An FD base station also may perform a SIM procedure in order to identify self-interference from transmissions of the FD base station. The UE may provide a measurement report to the base station to indicate results of the UE SIM. The base station may select pairs of beams (referred to herein as "beam pairs") for the UE ("UE beam pairs") and the base station ("base station beam pairs") to use during FD communications. A beam pair may include a UL beam and a DL beam. In some aspects, a beam pair may include a receive (Rx) beam and a transmit (Tx) beam.

The UL and DL beam pairs may be used to transmit and receive communications, respectively. However, to facilitate the communications, resources must be scheduled. DL and UL transmissions may include dynamic traffic, semi-persistent traffic, and/or periodic traffic. In FD mode, UL and DL communications may be transmitted and/or received simultaneously at a device using two different panels. In some cases, a single DCI transmission may be used to schedule both DL and UL communications. However, in some cases, if a gap between reception of the DCI and the DL and/or UL communications is not indicated, communications may be missed by a device, which may lead to retransmissions. As a result, FD DL and UL communications may increase overhead and decrease reliability, having a negative impact on network performance.

Some techniques and apparatuses described herein provide for a gap between a DCI transmission that schedules a UL communication and a DL communication. Resources may be scheduled for selected beam pairs. In some aspects, a base station may transmit, to a UE, a DCI transmission for scheduling a UL communication and a DL communication. The DCI transmission may indicate a gap between reception of the DCI transmission and transmission of the UL communication. The DCI transmission may indicate a gap between reception of the DCI transmission and reception of the DL communication. The UE may receive the DL communication and transmit the UL communication based at least in part on the DCI transmission and the gap. In this way, some aspects of the techniques and apparatuses described herein may facilitate scheduling a gap between DCI transmissions and scheduled FD resources, thereby increasing the chance of communications being successful. As a result, some aspects may reduce overhead and increase reliability, having a positive impact on network performance.

As indicated above, FIGS. 3A-3C are provided as one or more examples. Other examples may differ from what is described with regard to FIGS. 3A-3C.

Figure 4:
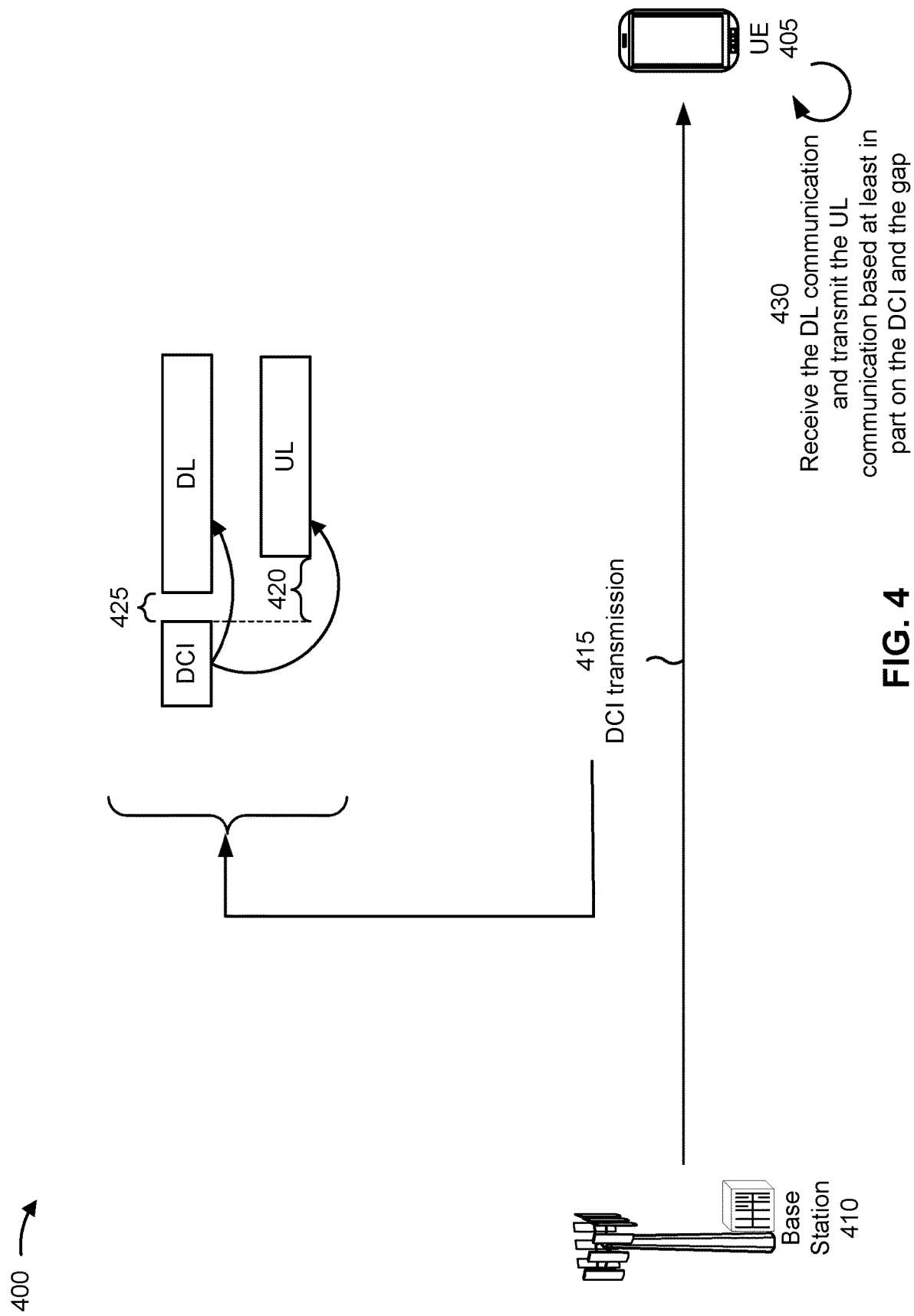
FIG. 4 is a diagram illustrating an example associated with a gap between a downlink control information (DCI) transmission and corresponding downlink and uplink communications, in accordance with the present disclosure.

FIG. 4 is a diagram illustrating an example 400 associated with a gap between a DCI transmission and corresponding downlink and uplink communications, in accordance with the present disclosure. As shown in FIG. 4, a UE 405 and a base station 410 may communicate with one another.

As shown by reference number 415, the base station 410 may transmit, and the UE 405 may receive, in a full duplex transmission mode, a DCI transmission that schedules an uplink communication and a downlink communication. The uplink transmission may include a physical uplink shared channel (PUSCH) transmission and the downlink transmission may include a physical downlink shared channel (PDSCH) transmission. The DCI transmission may indicate a first beam for use with the uplink transmission and a second beam for use with the downlink transmission. The uplink and downlink beams indicated in the DCI transmission may be paired for FD mode. The resource allocations may be fully overlapped, partially overlapped, or fully distinct.

As shown, the DCI transmission may indicate a gap 420 between reception of the DCI transmission and transmission of the uplink communication. In some aspects, the DCI transmission may indicate that the gap 420 also separates reception of the DCI transmission from reception of the downlink communication.

In some aspects, as shown, the DCI transmission may indicate an additional gap 425 between reception of the DCI transmission and reception of the downlink communication. The length of the additional gap 425 may be the same as the length of the gap 420. In some aspects, the length of the additional gap 425 may be different than the length of the gap 420. In some aspects, the DCI transmission may indicate a minimum length of the gap 420.

In some aspects, the DCI transmission may indicate a beam for use in receiving the downlink communication and/or a beam for use in transmitting the uplink communication. For example, in some aspects, the DCI transmission may indicate a full duplex beam pair to be used for the uplink communication and the downlink communication. For example, the full duplex beam pair may include a first beam associated with the uplink communication and a second beam associated with the downlink communication. The first beam and the second beam may be associated with a first antenna panel and a second antenna panel, respectively. In some aspects, the first beam and the second beam may be selected (e.g., by the base station 410) to minimize cross-beam interference during full duplex communications.

As shown by reference number 430, the UE 405 may receive the downlink communication and transmit the uplink communication based at least in part on the DCI transmission and the gap(s). For example, in some aspects, the UE 405 may receive the downlink communication using a beam indicated in the DCI transmission based at least in part on a determination that a length of the gap is longer than or equal to a length indicated by a time duration for a quasi co-location parameter (e.g., timeDurationForQCL). In some aspects, the uplink communication may be scheduled to start after a start of the downlink communication, and the UE 405 may transmit the uplink communication using an uplink beam that is paired with the beam for the downlink communication.

In some aspects, the UE 405 may receive the downlink communication using a default beam based at least in part on a determination that a length of the gap is shorter than a length indicated by the time duration for the quasi co-location parameter (e.g., timeDurationForQCL). In some aspects, the default beam may correspond to a core resource set (CORESET) beam associated with the DCI transmission.

In some aspects, the uplink communication may be scheduled to start after a start of the downlink communication, and the UE 405 may transmit the uplink communication using an uplink beam that is paired with the default beam. In some aspects, the uplink communication may be scheduled to partially overlap an overlapped portion of the downlink communication. In those aspects, the UE 405 may receive a non-overlapped portion of the downlink communication using a first beam and receive the overlapped portion of the downlink communication using a second beam that is paired with a third beam corresponding to the uplink communication. The DCI transmission may indicate the second beam and the third beam.

As indicated above, FIG. 4 is provided as an example. Other examples may differ from what is described with respect to FIG. 4.

Figure 5:
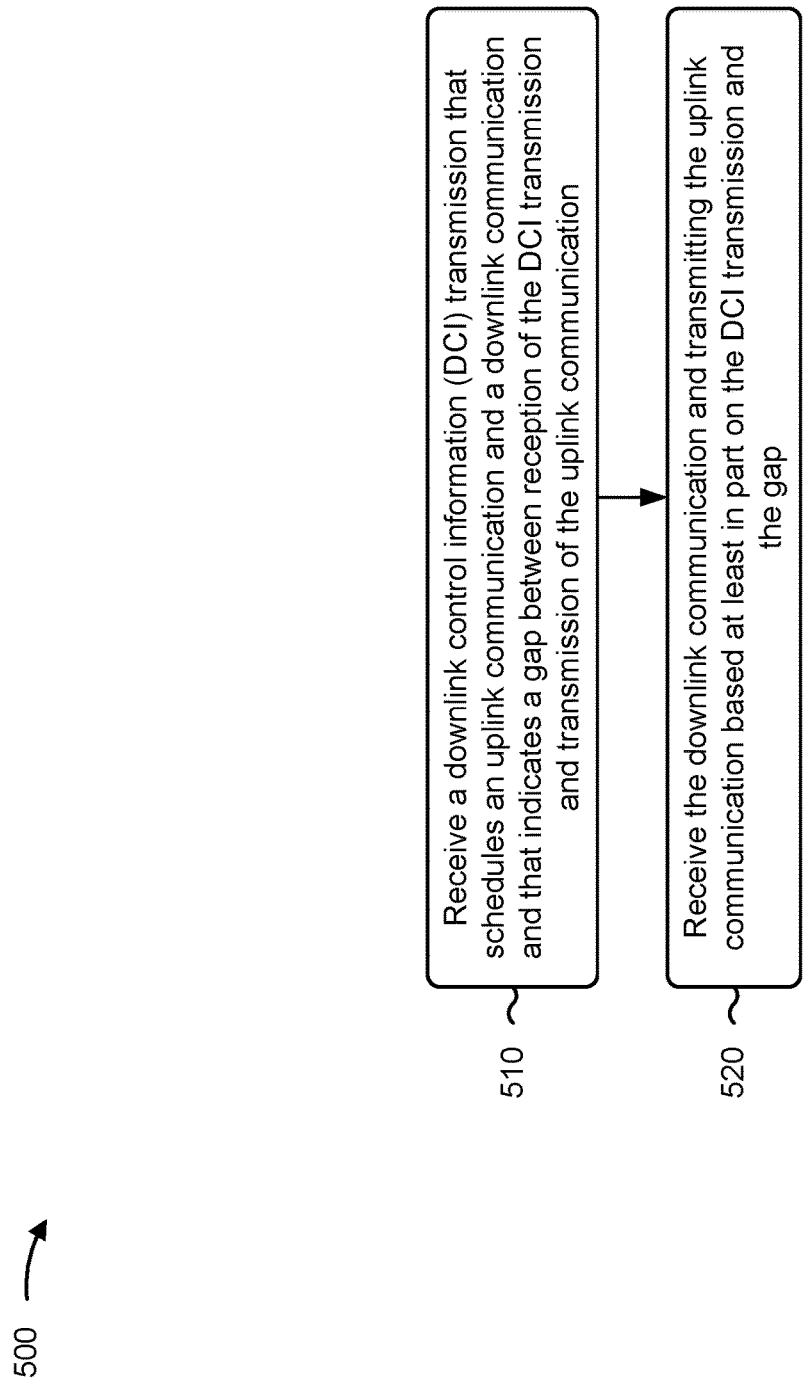
FIGS. 5 and 6 are diagrams illustrating example processes associated with a gap between a DCI transmission and corresponding downlink and uplink communications, in accordance with the present disclosure.

FIG. 5 is a diagram illustrating an example process 500 performed, for example, by a UE, in accordance with the present disclosure. Example process 500 is an example where the UE (e.g., UE 405) performs operations associated with a gap between DCI and corresponding downlink and uplink communications.

As shown in FIG. 5, in some aspects, process 500 may include receiving a DCI transmission that schedules an uplink communication and a downlink communication and that indicates a gap between reception of the DCI transmission and transmission of the uplink communication (block 510). For example, the UE (e.g., using reception component 702, depicted in FIG. 7) may receive a DCI transmission that schedules an uplink communication and a downlink communication and that indicates a gap between reception of the DCI transmission and transmission of the uplink communication, as described above.

As further shown in FIG. 5, in some aspects, process 500 may include receiving the downlink communication and transmitting the uplink communication based at least in part on the DCI transmission and the gap (block 520). For example, the UE (e.g., using reception component 702, depicted in FIG. 7) may receive the downlink communication and transmit the uplink communication based at least in part on the DCI transmission and the gap, as described above.

Process 500 may include additional aspects, such as any single aspect or any combination of aspects described below and/or in connection with one or more other processes described elsewhere herein.

In a first aspect, the DCI transmission indicates that the gap also separates reception of the DCI transmission from reception of the downlink communication.

In a second aspect, alone or in combination with the first aspect, the DCI transmission indicates an additional gap between reception of the DCI transmission and reception of the downlink communication, and a length of the additional gap is the same as a length of the gap.

In a third aspect, alone or in combination with one or more of the first and second aspects, the DCI transmission indicates an additional gap between reception of the DCI transmission and reception of the downlink communication, and a length of the additional gap is different than a length of the gap.

In a fourth aspect, alone or in combination with one or more of the first through third aspects, the DCI transmission indicates a minimum length of the gap.

In a fifth aspect, alone or in combination with one or more of the first through fourth aspects, the DCI transmission indicates a beam for use in receiving the downlink communication, and process 500 includes receiving the downlink communication using the beam based at least in part on a determination that a length of the gap is longer than or equal to a length indicated by a time duration for a quasi co-location parameter.

In a sixth aspect, alone or in combination with one or more of the first through fifth aspects, the uplink communication is scheduled to start after a start of the downlink communication, and process 500 includes transmitting the uplink communication using an uplink beam that is paired with the beam.

In a seventh aspect, alone or in combination with one or more of the first through sixth aspects, process 500 includes receiving the downlink communication using a default beam based at least in part on a determination that a length of the gap is shorter than a length indicated by a time duration for a quasi co-location parameter.

In an eighth aspect, alone or in combination with one or more of the first through seventh aspects, the default beam corresponds to a core resource set beam associated with the DCI transmission.

In a ninth aspect, alone or in combination with one or more of the first through eighth aspects, the uplink communication is scheduled to start after a start of the downlink communication, and process 500 includes transmitting the uplink communication using an uplink beam that is paired with the default beam.

In a tenth aspect, alone or in combination with one or more of the first through ninth aspects, the uplink communication is scheduled to partially overlap an overlapped portion of the downlink communication, and process 500 includes receiving a non-overlapped portion of the downlink communication using a first beam and receiving the overlapped portion of the downlink communication using a second beam that is paired with a third beam corresponding to the uplink communication.

In an eleventh aspect, alone or in combination with one or more of the first through tenth aspects, the DCI transmission indicates the second beam and the third beam.

In a twelfth aspect, alone or in combination with one or more of the first through eleventh aspects, a length of the gap is longer than a length indicated by a time duration for a quasi co-location parameter.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
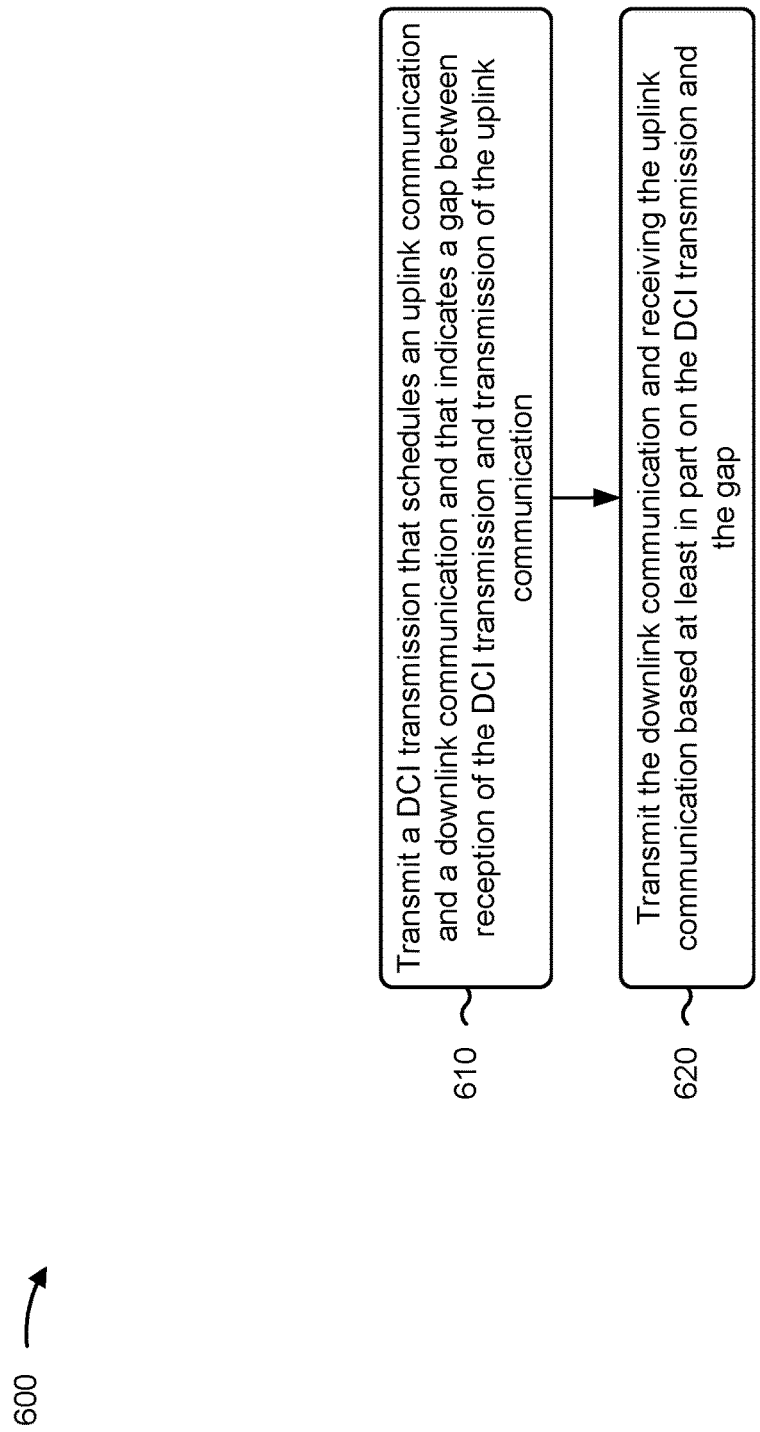

FIG. 6 is a diagram illustrating an example process 600 performed, for example, by a base station, in accordance with the present disclosure. Example process 600 is an example where the base station (e.g., base station 410) performs operations associated with a gap between downlink control information and corresponding downlink and uplink communications.

As shown in FIG. 6, in some aspects, process 600 may include transmitting a DCI transmission that schedules an uplink communication and a downlink communication and that indicates a gap between reception of the DCI transmission and transmission of the uplink communication (block 610). For example, the base station (e.g., using transmission component 804, depicted in FIG. 8) may transmit a DCI transmission that schedules an uplink communication and a downlink communication and that indicates a gap between reception of the DCI transmission and transmission of the uplink communication, as described above.

As further shown in FIG. 6, in some aspects, process 600 may include transmitting the downlink communication and receiving the uplink communication based at least in part on the DCI transmission and the gap (block 620). For example, the base station (e.g., using transmission component 804, depicted in FIG. 8) may transmit the downlink communication and receive the uplink communication based at least in part on the DCI transmission and the gap, as described above.

Process 600 may include additional aspects, such as any single aspect or any combination of aspects described below and/or in connection with one or more other processes described elsewhere herein.

In a first aspect, the DCI transmission indicates that the gap also separates reception of the DCI transmission from reception of the downlink communication.

In a second aspect, alone or in combination with the first aspect, the DCI transmission indicates an additional gap between reception of the DCI transmission and reception of the downlink communication, and a length of the additional gap is the same as a length of the gap.

In a third aspect, alone or in combination with one or more of the first and second aspects, the DCI transmission indicates an additional gap between reception of the DCI transmission and reception of the downlink communication, and a length of the additional gap is different than a length of the gap.

In a fourth aspect, alone or in combination with one or more of the first through third aspects, the DCI transmission indicates a minimum length of the gap.

In a fifth aspect, alone or in combination with one or more of the first through fourth aspects, the DCI transmission indicates a beam for use in receiving the downlink communication, and process 600 includes transmitting the downlink communication based at least in part on a determination that a length of the gap is longer than or equal to a length indicated by a time duration for a quasi co-location parameter.

In a sixth aspect, alone or in combination with one or more of the first through fifth aspects, the uplink communication is scheduled to start after a start of the downlink communication, and process 600 includes receiving the uplink communication using an uplink beam that is paired with a beam configured for transmitting the downlink communication.

In a seventh aspect, alone or in combination with one or more of the first through sixth aspects, process 600 includes transmitting the downlink communication based at least in part on a default beam based at least in part on a determination that a length of the gap is shorter than a length indicated by a time duration for a quasi co-location parameter.

In an eighth aspect, alone or in combination with one or more of the first through seventh aspects, the default beam corresponds to a core resource set beam associated with the DCI transmission.

In a ninth aspect, alone or in combination with one or more of the first through eighth aspects, the uplink communication is scheduled to start after a start of the downlink communication, and process 600 includes receiving the uplink communication based at least in part on an uplink beam that is paired with the default beam.

In a tenth aspect, alone or in combination with one or more of the first through ninth aspects, the uplink communication is scheduled to partially overlap an overlapped portion of the downlink communication, and process 600 includes transmitting a non-overlapped portion of the downlink communication based at least in part on a first beam and transmitting the overlapped portion of the downlink communication based at least in part on a second beam that is paired with a third beam corresponding to the uplink communication.

In an eleventh aspect, alone or in combination with one or more of the first through tenth aspects, the DCI transmission indicates the second beam and the third beam.

In a twelfth aspect, alone or in combination with one or more of the first through eleventh aspects, a length of the gap is longer than a length indicated by a time duration for a quasi co-location parameter.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
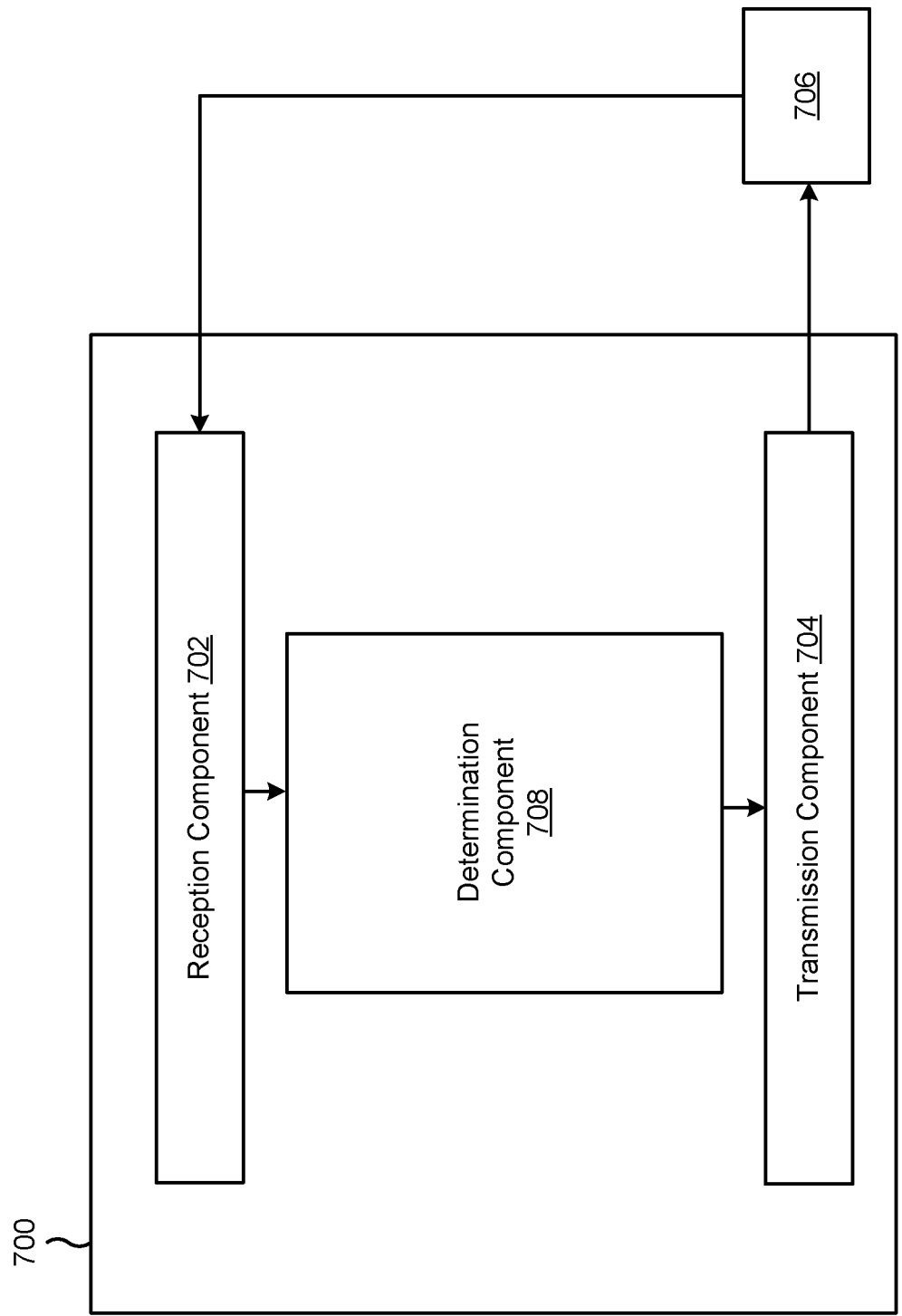
FIGS. 7 and 8 are block diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a determination component 708.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The reception component 702 may receive a DCI transmission that schedules an uplink communication and a downlink communication and that indicates a gap between reception of the DCI transmission and transmission of the uplink communication. The reception component 702 may receive the downlink communication and transmit the uplink communication based at least in part on the DCI transmission and the gap.

The reception component 702 may receive the downlink communication using a default beam based at least in part on a determination that a length of the gap is shorter than a length indicated by a time duration for a quasi co-location parameter.

The determination component 708 may determine a length of a gap, among other determination operations. In some aspects, the determination component 708 may include one or more antennas, a modulator, a transmit MIMO processor, a transmit processor, a controller/processor, a memory, or a combination thereof, of the UE described above in connection with FIG. 2. In some aspects, the determination component 708 may include the reception component 702 and/or the transmission component 704.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
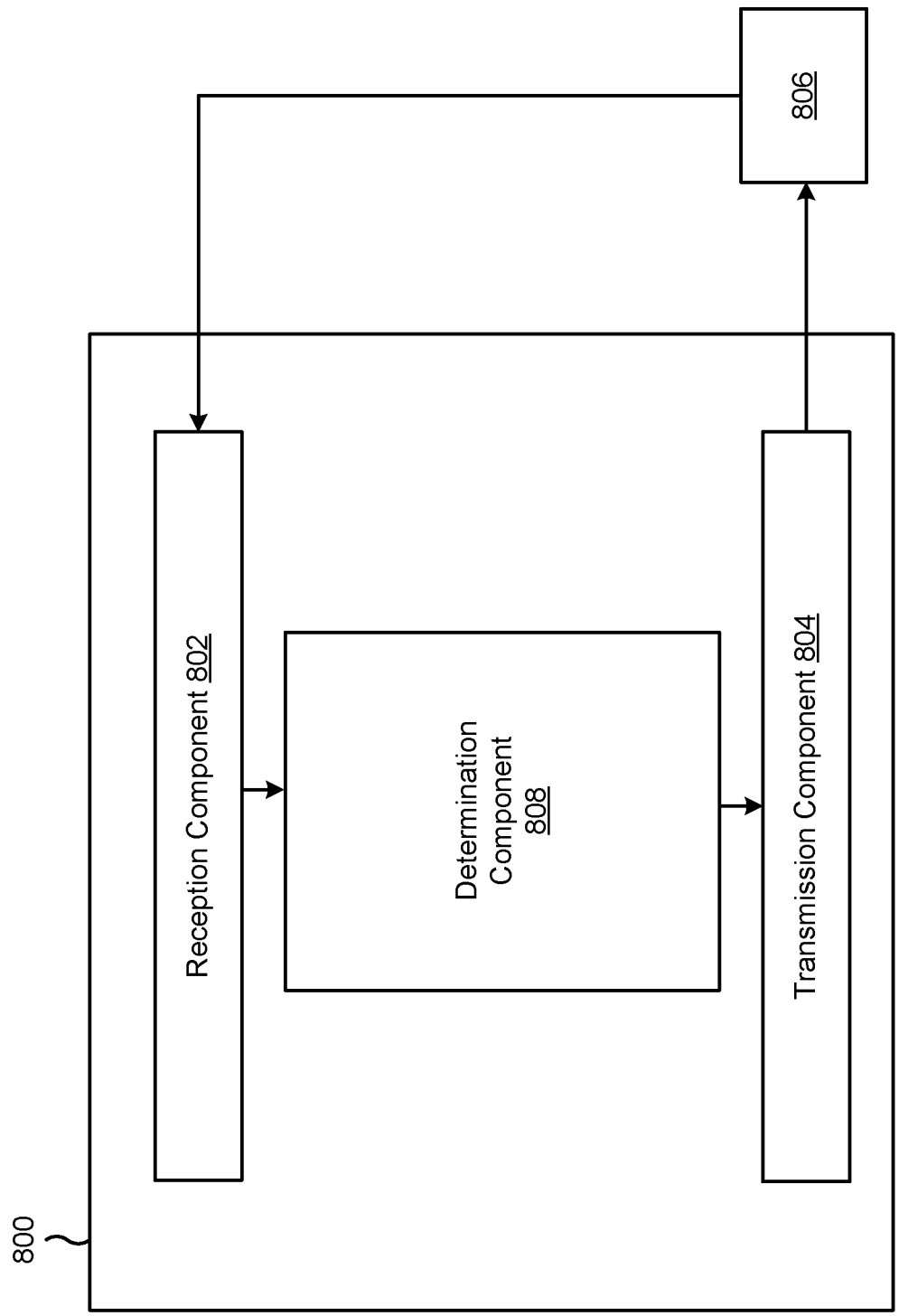

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a determination component 808.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The transmission component 804 may transmit a DCI transmission that schedules an uplink communication and a downlink communication and that indicates a gap between reception of the DCI transmission and transmission of the uplink communication. The transmission component 804 may transmit the downlink communication and receive the uplink communication based at least in part on the DCI transmission and the gap.

The transmission component 804 may transmit the downlink communication based at least in part on a default beam based at least in part on a determination that a length of the gap is shorter than a length indicated by a time duration for a quasi co-location parameter.

The determination component 808 may determine a length of a gap and/or a resource allocation, among other examples. In some aspects, the determination component 808 may include one or more antennas, a modulator, a transmit MIMO processor, a transmit processor, a controller/processor, a memory, or a combination thereof, of the base station described above in connection with FIG. 2. In some aspects, the determination component 808 may include the reception component 802 and/or the transmission component 804.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving a downlink control information (DCI) transmission that schedules an uplink communication and a downlink communication and that indicates a gap between reception of the DCI transmission and transmission of the uplink communication; and receiving the downlink communication and transmitting the uplink communication based at least in part on the DCI transmission and the gap.

Aspect 2: The method of Aspect 1, wherein the DCI transmission indicates that the gap also separates reception of the DCI transmission from reception of the downlink communication.

Aspect 3: The method of Aspect 1, wherein the DCI transmission indicates an additional gap between reception of the DCI transmission and reception of the downlink communication, and wherein a length of the additional gap is the same as a length of the gap.

Aspect 4: The method of Aspect 1, wherein the DCI transmission indicates an additional gap between reception of the DCI transmission and reception of the downlink communication, and wherein a length of the additional gap is different than a length of the gap.

Aspect 5: The method of any of Aspects 1-4, wherein the DCI transmission indicates a minimum length of the gap.

Aspect 6: The method of any of Aspects 1-5, wherein the DCI transmission indicates a beam for use in receiving the downlink communication, the method further comprising receiving the downlink communication using the beam based at least in part on a determination that a length of the gap is longer than or equal to a length indicated by a time duration for a quasi co-location parameter.

Aspect 7: The method of Aspect 6, wherein the uplink communication is scheduled to start after a start of the downlink communication, the method further comprising transmitting the uplink communication using an uplink beam that is paired with the beam.

Aspect 8: The method of any of Aspects 1-7, further comprising receiving the downlink communication using a default beam based at least in part on a determination that a length of the gap is shorter than a length indicated by a time duration for a quasi co-location parameter.

Aspect 9: The method of Aspect 8, wherein the default beam corresponds to a core resource set beam associated with the DCI transmission.

Aspect 10: The method of either of Aspects 8 or 9, wherein the uplink communication is scheduled to start after a start of the downlink communication, the method further comprising transmitting the uplink communication using an uplink beam that is paired with the default beam.

Aspect 11: The method of any of Aspects 1-10, wherein the uplink communication is scheduled to partially overlap an overlapped portion of the downlink communication, the method further comprising receiving a non-overlapped portion of the downlink communication using a first beam and receiving the overlapped portion of the downlink communication using a second beam that is paired with a third beam corresponding to the uplink communication.

Aspect 12: The method of Aspect 11, wherein the DCI transmission indicates the second beam and the third beam.

Aspect 13: The method of Aspect 10, wherein a length of the gap is longer than a length indicated by a time duration for a quasi co-location parameter.

Aspect 14: A method of wireless communication performed by a base station, comprising: transmitting a downlink control information (DCI) transmission that schedules an uplink communication and a downlink communication and that indicates a gap between reception of the DCI transmission and transmission of the uplink communication; and transmitting the downlink communication and receiving the uplink communication based at least in part on the DCI transmission and the gap.

Aspect 15: The method of Aspect 14, wherein the DCI transmission indicates that the gap also separates reception of the DCI transmission from reception of the downlink communication.

Aspect 16: The method of Aspect 14, wherein the DCI transmission indicates an additional gap between reception of the DCI transmission and reception of the downlink communication, and wherein a length of the additional gap is the same as a length of the gap.

Aspect 17: The method of Aspect 14, wherein the DCI transmission indicates an additional gap between reception of the DCI transmission and reception of the downlink communication, and wherein a length of the additional gap is different than a length of the gap.

Aspect 18: The method of any of Aspects 14-17, wherein the DCI transmission indicates a minimum length of the gap.

Aspect 19: The method of any of Aspects 14-18, wherein the DCI transmission indicates a beam for use in receiving the downlink communication, the method further comprising transmitting the downlink communication based at least in part on a determination that a length of the gap is longer than or equal to a length indicated by a time duration for a quasi co-location parameter.

Aspect 20: The method of Aspect 19, wherein the uplink communication is scheduled to start after a start of the downlink communication, the method further comprising receiving the uplink communication using an uplink beam that is paired with a beam configured for transmitting the downlink communication.

Aspect 21: The method of any of Aspects 14-19, further comprising transmitting the downlink communication based at least in part on a default beam based at least in part on a determination that a length of the gap is shorter than a length indicated by a time duration for a quasi co-location parameter.

Aspect 22: The method of Aspect 21, wherein the default beam corresponds to a core resource set beam associated with the DCI transmission.

Aspect 23: The method of either of Aspects 21 or 22, wherein the uplink communication is scheduled to start after a start of the downlink communication, the method further comprising receiving the uplink communication based at least in part on an uplink beam that is paired with the default beam.

Aspect 24: The method of any of Aspects 14-23, wherein the uplink communication is scheduled to partially overlap an overlapped portion of the downlink communication, the method further comprising transmitting a non-overlapped portion of the downlink communication based at least in part on a first beam and transmitting the overlapped portion of the downlink communication based at least in part on a second beam that is paired with a third beam corresponding to the uplink communication.

Aspect 25: The method of Aspect 24, wherein the DCI transmission indicates the second beam and the third beam.

Aspect 26: The method of Aspect 24, wherein a length of the gap is longer than a length indicated by a time duration for a quasi co-location parameter.

Aspect 27: An apparatus for wireless communication at a device, comprising a processor; memory coupled with the processor; and instructions stored in the memory and executable by the processor to cause the apparatus to perform the method of one or more Aspects of Aspects 1-13.

Aspect 28: A device for wireless communication, comprising a memory and one or more processors coupled to the memory, the memory and the one or more processors configured to perform the method of one or more Aspects of Aspects 1-13.

Aspect 29: An apparatus for wireless communication, comprising at least one means for performing the method of one or more Aspects of Aspects 1-13.

Aspect 30: A non-transitory computer-readable medium storing code for wireless communication, the code comprising instructions executable by a processor to perform the method of one or more Aspects of Aspects 1-13.

Aspect 31: A non-transitory computer-readable medium storing a set of instructions for wireless communication, the set of instructions comprising one or more instructions that, when executed by one or more processors of a device, cause the device to perform the method of one or more Aspects of Aspects 1-13.

Aspect 32: An apparatus for wireless communication at a device, comprising a processor; memory coupled with the processor; and instructions stored in the memory and executable by the processor to cause the apparatus to perform the method of one or more Aspects of Aspects 14-26.

Aspect 33: A device for wireless communication, comprising a memory and one or more processors coupled to the memory, the memory and the one or more processors configured to perform the method of one or more Aspects of Aspects 14-26.

Aspect 34: An apparatus for wireless communication, comprising at least one means for performing the method of one or more Aspects of Aspects 14-26.

Aspect 35: A non-transitory computer-readable medium storing code for wireless communication, the code comprising instructions executable by a processor to perform the method of one or more Aspects of Aspects 14-26.

Aspect 36: A non-transitory computer-readable medium storing a set of instructions for wireless communication, the set of instructions comprising one or more instructions that, when executed by one or more processors of a device, cause the device to perform the method of one or more Aspects of Aspects 14-26.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
receive a downlink control information (DCI) transmission that schedules an uplink communication and a downlink communication and that indicates a first gap between reception of the DCI transmission and transmission of the uplink communication;
transmit the uplink communication based at least in part on the DCI transmission and the first gap; and
receive the downlink communication based at least in part on the DCI transmission and a second gap between reception of the DCI transmission and reception of the downlink communication, a length of the second gap being the same as a length of the first gap.

2. The UE of claim 1, wherein the DCI transmission indicates that the first gap also separates reception of the DCI transmission from reception of the downlink communication.

3. The UE of claim 1, wherein the DCI transmission indicates the second gap between reception of the DCI transmission and reception of the downlink communication.

4. The UE of claim 1, wherein the DCI transmission indicates a minimum length of the first gap.

5. The UE of claim 1, wherein the DCI transmission indicates a beam for use in receiving the downlink communication, and wherein the one or more processors are further configured to receive the downlink communication using the beam based at least in part on a determination that the length of the first gap is longer than or equal to a length indicated by a time duration for a quasi co-location parameter.

6. The UE of claim 5, wherein the one or more processors are further configured to transmit the uplink communication using an uplink beam that is paired with the beam.

7. The UE of claim 1, wherein the one or more processors are further configured to receive the downlink communication using a default beam based at least in part on a determination that the length of the first gap is shorter than a length indicated by a time duration for a quasi co-location parameter.

8. The UE of claim 7, wherein the default beam corresponds to a core resource set beam associated with the DCI transmission.

9. The UE of claim 7, wherein the one or more processors are further configured to transmit the uplink communication using an uplink beam that is paired with the default beam.

10. The UE of claim 1, wherein the uplink communication is scheduled to partially overlap an overlapped portion of the downlink communication, and wherein the one or more processors are further configured to receive a non-overlapped portion of the downlink communication using a first beam and receive the overlapped portion of the downlink communication using a second beam that is paired with a third beam corresponding to the uplink communication.

11. The UE of claim 10, wherein the DCI transmission indicates the second beam and the third beam.

12. The UE of claim 10, wherein the length of the first gap is longer than a length indicated by a time duration for a quasi co-location parameter.

13. A base station for wireless communication, comprising:
a memory; and
one or more processors, coupled to the memory, configured to:
transmit a downlink control information (DCI) transmission that schedules an uplink communication and a downlink communication and that indicates a first gap between reception of the DCI transmission and transmission of the uplink communication;
receive the uplink communication based at least in part on the DCI transmission and the first gap; and
transmit the downlink communication based at least in part on the DCI transmission and a second gap between reception of the DCI transmission and reception of the downlink communication, a length of the second gap being the same as a length of the first gap.

14. The base station of claim 13, wherein the DCI transmission indicates that the first gap also separates reception of the DCI transmission from reception of the downlink communication.

15. The base station of claim 13, wherein the DCI transmission indicates the second gap between reception of the DCI transmission and reception of the downlink communication.

16. The base station of claim 13, wherein the DCI transmission indicates a minimum length of the first gap.

17. The base station of claim 13, wherein the DCI transmission indicates a beam for use in receiving the downlink communication, and wherein the one or more processors are further configured to transmit the downlink communication based at least in part on a determination that the length of the first gap is longer than or equal to a length indicated by a time duration for a quasi co-location parameter.

18. The base station of claim 17, wherein the one or more processors are further configured to receive the uplink communication using an uplink beam that is paired with a beam configured for transmitting the downlink communication.

19. The base station of claim 13, wherein the one or more processors are further configured to transmit the downlink communication based at least in part on a default beam based at least in part on a determination that the length of the first gap is shorter than a length indicated by a time duration for a quasi co-location parameter.

20. The base station of claim 19, wherein the default beam corresponds to a core resource set beam associated with the DCI transmission.

21. The base station of claim 19, wherein the one or more processors are further configured to receive the uplink communication based at least in part on an uplink beam that is paired with the default beam.

22. The base station of claim 13, wherein the uplink communication is scheduled to partially overlap an overlapped portion of the downlink communication, and wherein the one or more processors are further configured to transmit a non-overlapped portion of the downlink communication based at least in part on a first beam and transmit the overlapped portion of the downlink communication based at least in part on a second beam that is paired with a third beam corresponding to the uplink communication.

23. The base station of claim 22, wherein the DCI transmission indicates the second beam and the third beam.

24. The base station of claim 22, wherein the length of the first gap is longer than a length indicated by a time duration for a quasi co-location parameter.

25. A method of wireless communication performed by a user equipment (UE), comprising:
receiving a downlink control information (DCI) transmission that schedules an uplink communication and a downlink communication and that indicates a first gap between reception of the DCI transmission and transmission of the uplink communication;
transmitting the uplink communication based at least in part on the DCI transmission and the first gap; and
receiving the downlink communication based at least in part on the DCI transmission and a second gap between reception of the DCI transmission and reception of the downlink communication, a length of the second gap being the same as a length of the first gap.

26. The method of claim 25, wherein the DCI transmission indicates that the first gap also separates reception of the DCI transmission from reception of the downlink communication.

27. The method of claim 25, wherein the DCI transmission indicates the second gap between reception of the DCI transmission and reception of the downlink communication.

28. A method of wireless communication performed by a base station, comprising:
- transmitting a downlink control information (DCI) transmission that schedules an uplink communication and a downlink communication and that indicates a first gap between reception of the DCI transmission and transmission of the uplink communication;
- receiving the uplink communication based at least in part on the DCI transmission and the first gap; and
- transmitting the downlink communication based at least in part on the DCI transmission and a second gap between reception of the DCI transmission and reception of the downlink communication, a length of the second gap being the same as a length of the first gap.

* * * * *